United States Patent
Han et al.

(10) Patent No.: US 10,775,623 B2
(45) Date of Patent: Sep. 15, 2020

(54) METHOD FOR PROVIDING VIRTUAL IMAGE TO USER IN HEAD-MOUNTED DISPLAY DEVICE, MACHINE-READABLE STORAGE MEDIUM, AND HEAD-MOUNTED DISPLAY DEVICE

(71) Applicant: Samsung Electronics Co., Ltd., Gyeonggi-do (KR)

(72) Inventors: Soon-Seob Han, Seoul (KR); Sang-Tae Kim, Gyeonggi-do (KR); Doo-Woong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 154 days.

(21) Appl. No.: 16/006,447

(22) Filed: Jun. 12, 2018

(65) Prior Publication Data

US 2018/0292649 A1   Oct. 11, 2018

Related U.S. Application Data

(63) Continuation of application No. 14/062,397, filed on Oct. 24, 2013, now Pat. No. 10,001,647.

(30) Foreign Application Priority Data

Oct. 24, 2012   (KR) .................. 10-2012-0118251

(51) Int. Cl.
    *G02B 27/01*   (2006.01)
(52) U.S. Cl.
    CPC ...... *G02B 27/017* (2013.01); *G02B 2027/014* (2013.01); *G02B 2027/0118* (2013.01); *G02B 2027/0178* (2013.01)

(58) Field of Classification Search
    CPC ........ G02B 27/0103; G02B 2027/0174; G02B 27/0172; G02B 27/017; G02B 2027/0118;
    (Continued)

(56) References Cited

U.S. PATENT DOCUMENTS

| 7,928,955 B1 | 4/2011 | Bell |
| 2004/0108971 A1 | 6/2004 | Waldern |

(Continued)

FOREIGN PATENT DOCUMENTS

| JP | 08-006708 | 1/1996 |
| JP | 11-064782 | 3/1999 |

(Continued)

OTHER PUBLICATIONS

Azuma, "A Survey of Augmented Reality", In Presence: Teleoperators and Virtual Environments 6, 4 (Aug. 1997), 48 pages.

(Continued)

*Primary Examiner* — Jade R Chwasz
(74) *Attorney, Agent, or Firm* — The Farrell Law Firm, P.C.

(57) ABSTRACT

A method is disclosed for providing a virtual image to a user in a Head-Mounted Display (HMD) device. The method includes detecting an ambient illumination, calculating a target transmissivity of window provided in the HMD device, based on the ambient illumination, adjusting a transmissivity of the window based on the calculated target transmissivity, and providing a virtual image to the user by projecting light to the window from a projector provided in the HMD device.

18 Claims, 15 Drawing Sheets

(58) Field of Classification Search
CPC ............ G02B 27/22; G02B 2027/0112; G02B 2027/0178; G02B 2027/0132; G02B 2027/014; G02B 2027/0141; G02B 2027/0147; G02B 2027/0187; G02B 2027/0196; G02B 27/0025; G02B 27/01; G02B 27/0101; G02B 27/0149; G02B 27/0176; G02B 27/1066
USPC .... 359/9, 10, 11, 13, 15, 22, 23, 24, 25, 34, 359/35
See application file for complete search history.

(56) References Cited

U.S. PATENT DOCUMENTS

| | | | |
|---|---|---|---|
| 2011/0227813 A1* | 9/2011 | Haddick | G02B 27/017 345/8 |
| 2012/0001833 A1* | 1/2012 | Lindig | G02B 27/017 345/8 |
| 2012/0119978 A1 | 5/2012 | Border et al. | |
| 2013/0293468 A1 | 11/2013 | Perez | |

FOREIGN PATENT DOCUMENTS

| | | |
|---|---|---|
| JP | 2006-209144 | 8/2006 |
| KR | 1020090066042 | 6/2009 |

OTHER PUBLICATIONS

Korean Office Action dated Sep. 14, 2018 issued in counterpart application No. 10-2012-0118251, 11 pages.
Korean Office Action dated Mar. 10, 2020 issued in counterpart application No. 10-2019-0067342, 12 pages.

* cited by examiner

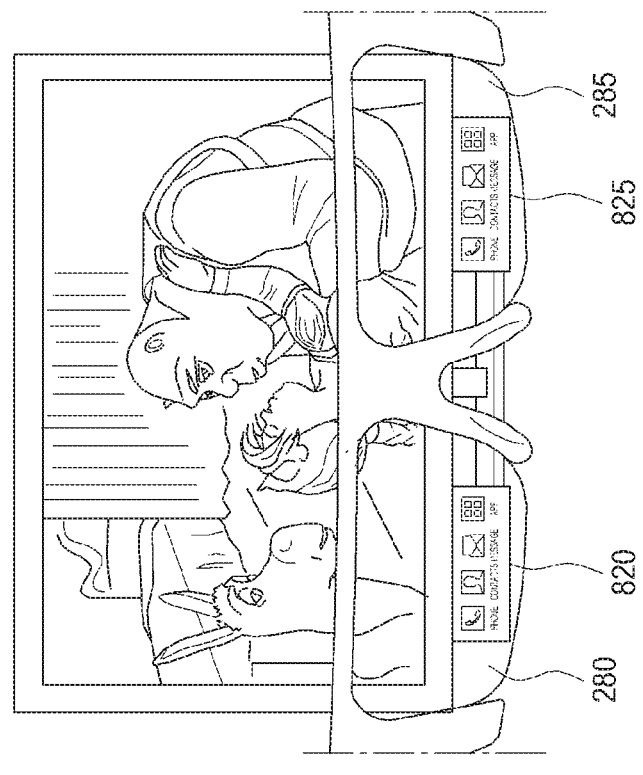
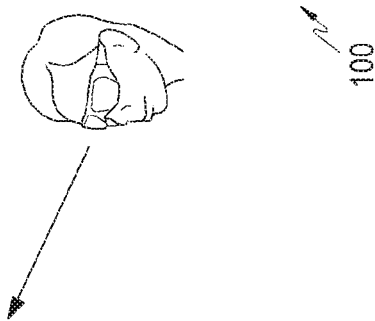
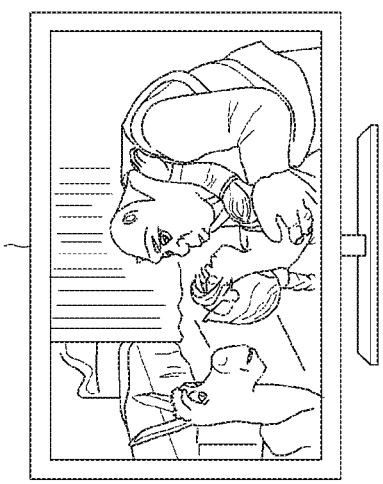
FIG.8A
FIG.8B

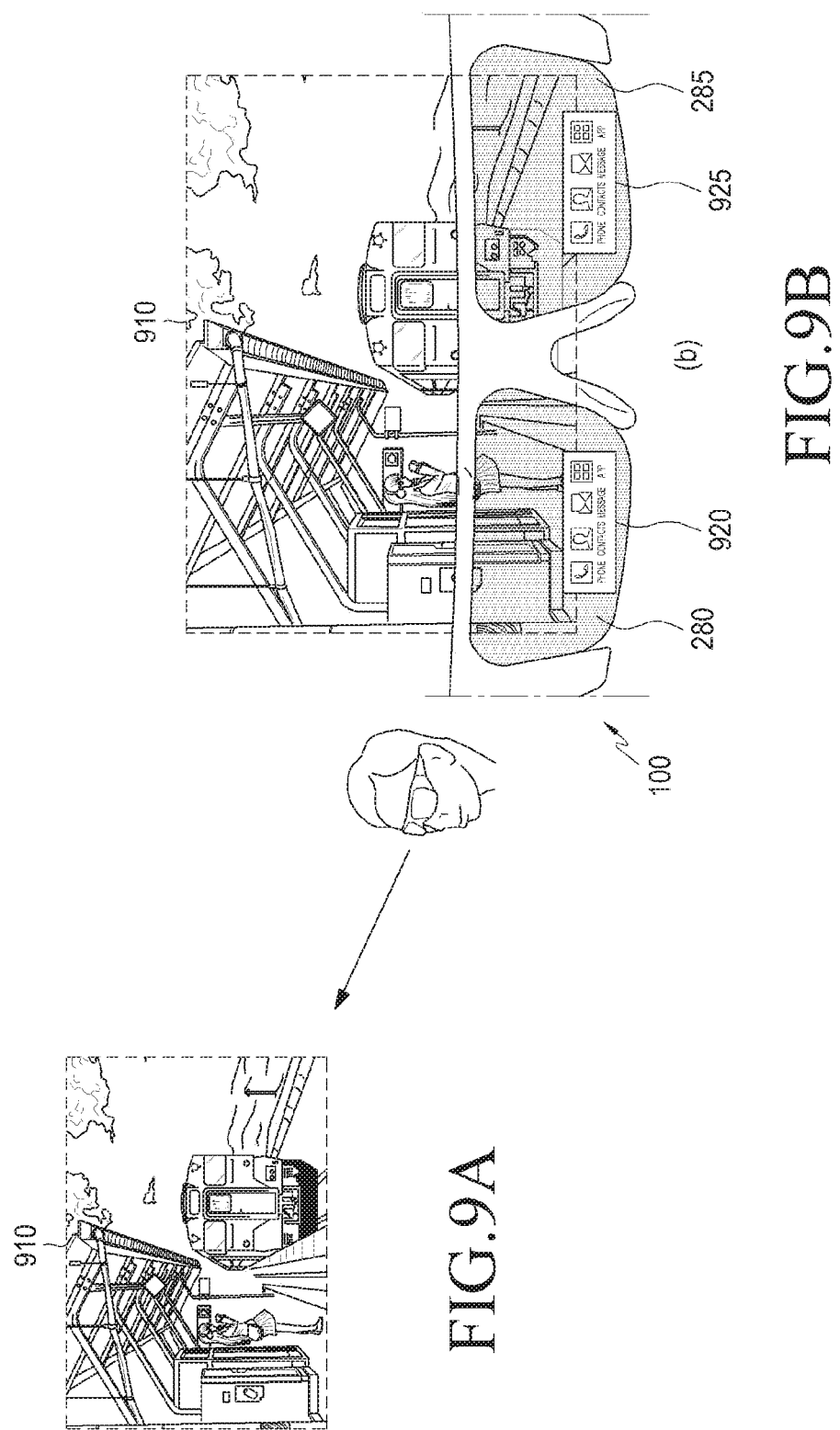

US 10,775,623 B2

METHOD FOR PROVIDING VIRTUAL IMAGE TO USER IN HEAD-MOUNTED DISPLAY DEVICE, MACHINE-READABLE STORAGE MEDIUM, AND HEAD-MOUNTED DISPLAY DEVICE

PRIORITY

This application is a Continuation of, and claims priority under 35 U.S.C. § 120 to, U.S. patent application Ser. No. 14/062,397, which was filed on Oct. 24, 2013, issued on Jun. 19, 2018, as U.S. Pat. No. 10,001,647, and claims priority under 35 U.S.C. § 119(a) to Korean Patent Application Ser. No. 10-2012-0118251, which was filed in the Korean Intellectual Property Office on Oct. 24, 2012, the contents of all of which are incorporated herein by reference.

BACKGROUND OF THE INVENTION

1. Field of the Invention

The present invention relates generally to a wearable display device, and more particularly, to a Head-Mounted Display (HMD) device.

2. Description of the Related Art

A conventional, see-through HMD device includes one or two cameras for acquiring an image of an actual surrounding environment. The video see-through HMD device synthesizes an actual image input from a camera with a virtual image generated by a computer by using a video synthesizer, and presents the synthesized image to a user through a display such as a Liquid Crystal Display (LCD) attached on the HMD device.

The video see-through HMD device may accurately display a virtual object in a desired position by using a computer vision technique. However, since the display screen is small, the resolutions of both actual and virtual environments are limited.

SUMMARY OF THE INVENTION

The present invention has been made to address the problems and/or disadvantages described above.

Accordingly, various aspects of the present invention provide an HMD device that simultaneously provides a virtual image and an actual image, reduces the weight and size of the HMD device, improves the outdoor visibility of the virtual image, and has low power consumption and low heat emission.

Other aspects to be provided in the present invention may be understood by embodiments described below.

According to an aspect of the present invention, there is provided a method for providing a virtual image to a user in an HMD device, including detecting an ambient illumination, calculating a target transmissivity of a window provided in the HMD device, based on the ambient illumination, adjusting a transmissivity of the window based on the calculated target transmissivity, and providing a virtual image to the user by projecting light to the window from a projector provided in the HMD device, where output of the projector is adjusted based on a change in the transmissivity of the window.

According to another aspect of the present invention, there is provided a computer-readable storage medium having recorded thereon a program for executing a method for providing a virtual image to a user in an HMD device, and an HMD device including the storage medium. The method includes detecting an ambient illumination, calculating a target transmissivity of a window provided in the HMD device, based on the ambient illumination, adjusting a transmissivity of the window based on the calculated target transmissivity, and providing a virtual image to the user by projecting light to the window from a projector provided in the HMD device, where output of the projector is adjusted based on a change in the transmissivity of the window.

According to another aspect of the present invention, there is provided an HMD device for providing a virtual image to a user, including a sensor unit configured to detect an ambient illumination, a projector configured to project light, a window configured to condense and reflect the light projected by the projector and to provide a virtual image formed by the reflected light to the user, and a controller configured to calculate a target transmissivity of the window corresponding to the detected ambient illumination and adjust a transmissivity of the window according to the target transmissivity, where output of the projector is adjusted based on a change in the transmissivity of the window.

BRIEF DESCRIPTION OF THE DRAWINGS

The above and other aspects, features and advantages of certain embodiments of the present invention will be more apparent from the following detailed description taken in conjunction with the accompanying drawings, in which:

FIGS. 8A through 9B are views describing transmissivity control of an HMD device according to an embodiment of the present invention;

DETAILED DESCRIPTION OF THE EMBODIMENTS OF THE INVENTION

Figure 1:
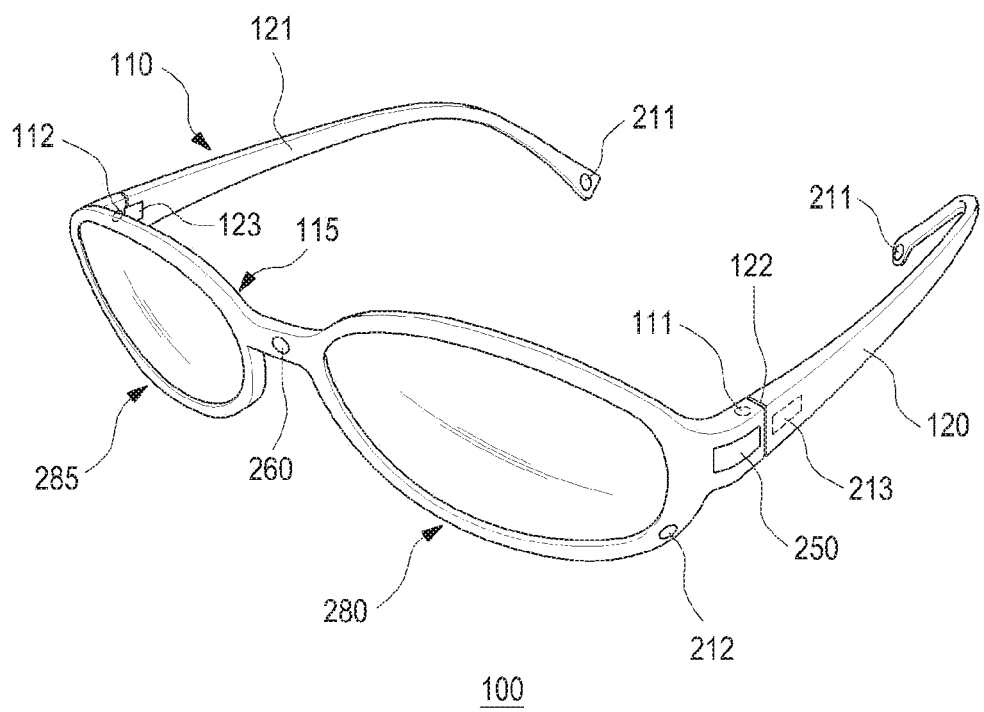
FIG. 1 illustrates an HMD device viewed from an outer side according to an embodiment of the present invention.

Embodiments of the present invention will be described with reference to the accompanying drawings. Throughout the drawings, like reference numerals will be understood to refer to like parts, components, and structures. In the following description of the present invention, a detailed description of known functions and configurations incorporated herein will be omitted for the sake of clarity and conciseness.

Although ordinal numbers such as "first," "second," and so forth will be used to describe various components, those components are not limited by the terms. The ordinal terms are used only for distinguishing one component from another component. A first component may be referred to as a second component and likewise, a second component may also be referred to as a first component, without departing from the teaching of the present invention. The term "and/or" used herein includes any and all combinations of one or more of the associated listed items.

When it is mentioned that a component is "connected to" or "accessed by" another component, it may be understood that the component is directly connected to or accessed by the other component or that still another component is interposed between the two components. When it is mentioned that a component is "directly connected to" or "directly accessed by" to another component, it may be understood that no component is interposed therebetween.

Figure 2:
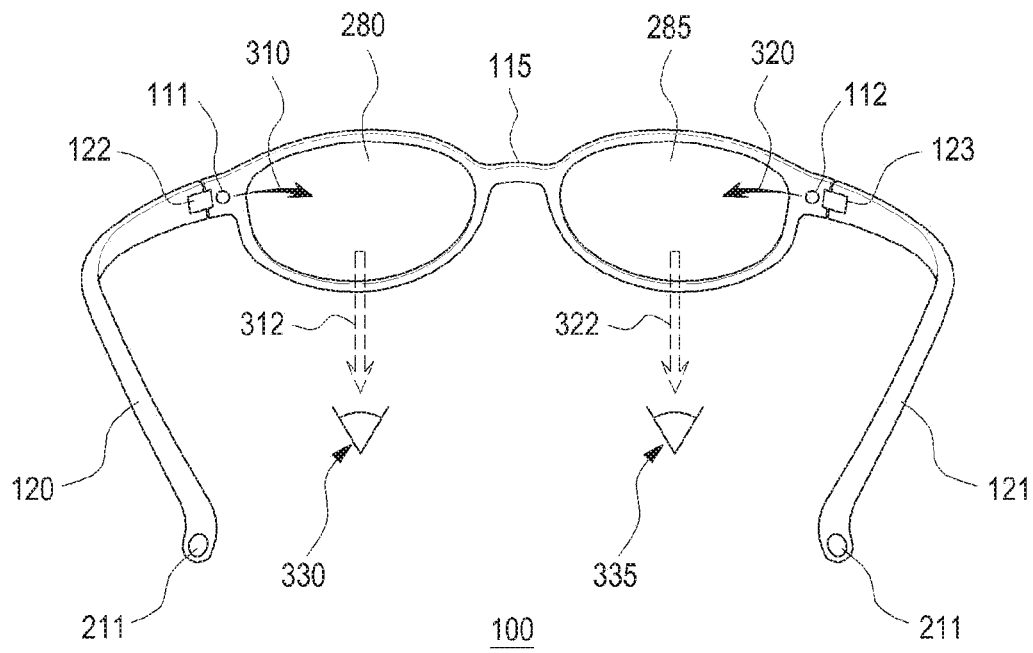
FIG. 2 illustrates an HMD device viewed from an inner side according to an embodiment of the present invention.

FIG. 1 illustrates an HMD device viewed from an outer side according to an embodiment of the present invention, and FIG. 2 illustrates an HMD device viewed from an inner side according to an embodiment of the present invention.

An HMD device 100 has the appearance of glasses or eyewear, and is a portable terminal (or a portable communication terminal). The HMD device 100 includes an HMD housing 110 and an HMD circuit (shown in FIG. 3) mounted in the HMD housing 110.

The HMD housing 110 includes a front frame 115 in which a first window 280 and a second window 285 corresponding to the left eye and the right eye are respectively fixed, and a first temple frame 120 and a second temple frame 121 that are inwardly folded or outwardly unfolded by a first hinge 122 and a second hinge 123. Hereinafter, the left eye and the right eye are referred to as a first eye and a second eye, respectively. In the present invention, the first window 280 and the second window 285 can be referred to as a first window panel and a second window panel, respectively.

A camera 260 is disposed on an outer surface of the front frame 115, and the camera 260 is disposed in a portion of the front frame 115 between the first window 280 and the second window 285 (that is, in a bridge area of conventional glasses).

A microphone 212 is disposed on the outer surface of the front frame 115, and a touch sensor 250 is also disposed on the outer surface of the front frame 115.

In an inner surface of the front frame 115, a first opening 111 is disposed and provides a path through which first projection light 310 output from a first projector (shown in FIG. 3) disposed in the front frame 115 is output to the outside of the front frame 115. A second opening 112 is disposed in the inner surface of the front frame 115, and provides a path through which second projection light 320 output from a second projector (shown in FIG. 3) disposed in the front frame 115 is output outside the front frame 115. Transparent protection glass for blocking introduction of external dust into the front frame 115 may be installed in each of the first opening 111 and the second opening 112.

At least one button 213 is disposed on the outer surface of the first temple frame 120.

At least one speaker 211 is disposed on the inner surface of the first temple frame 120 and/or the second temple frame 121.

The first projector outputs the first projection light 310 for forming a first virtual image, and the first projection light 310 output from the first projector is condensed and reflected by the first window 280. The condensed and reflected first projection light 312 forms the first virtual image on the retina of the left eye 330 of the user. Condensing includes convergence of light into one point or reduction of a beam spot size of light. Preferably, the reflected first projection light 312 converges to the crystalline lens or pupil of the left eye 330.

The second projector outputs the second projection light 320 for forming a second virtual image, and the second projection light 320 output from the second projector 275 is condensed and reflected by the second window 285. The condensed and reflected second projection light 322 forms the second virtual image on a retina of the right eye 335 of the user. Preferably, the condensed and reflected second projection light 322 converges to the crystalline lens or pupil of the right eye 335. Although two projectors are used in the current example, only one projector may also be used.

Although the first virtual image and the second virtual image are similar to each other except that they are displayed on the left eye and the right eye, the present invention is not limited thereto, and one of the first virtual image and the second virtual image may be displayed.

Figure 3:
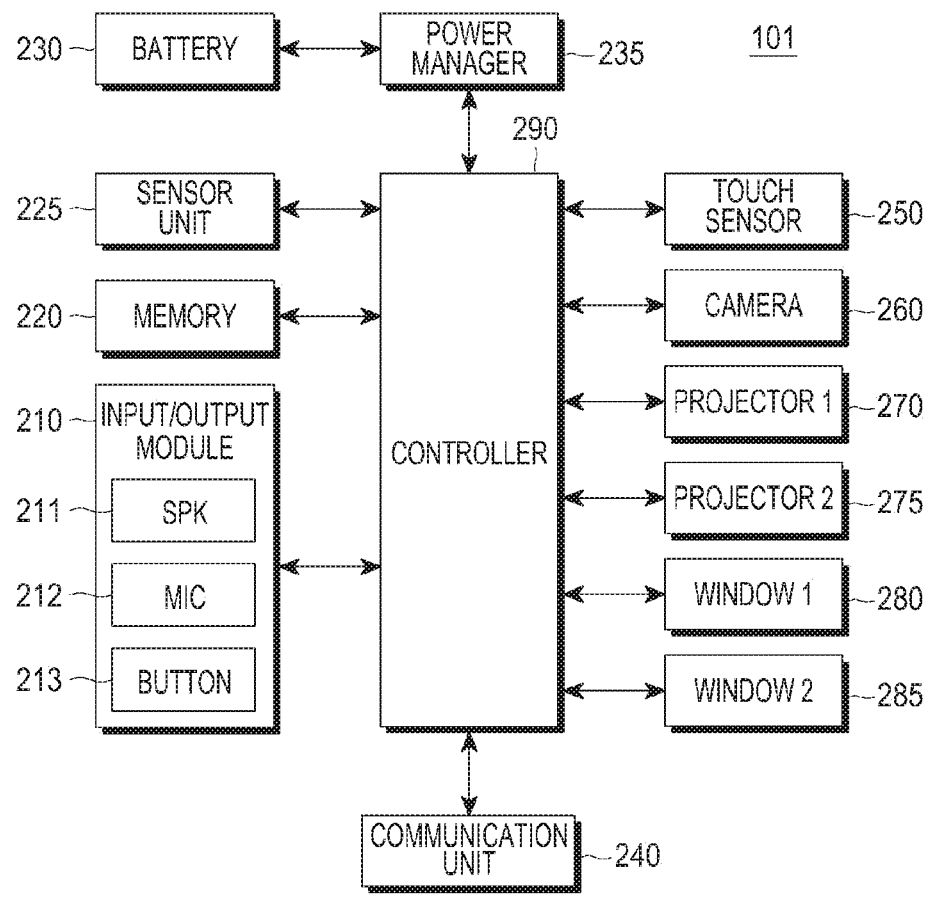
FIG. 3 illustrates a structure of an HMD circuit according to an embodiment of the present invention.

FIG. 3 illustrates a structure of the HMD circuit 101 according to an embodiment of the present invention.

The HMD circuit 101 includes an input/output module 210, a memory 220, a sensor unit 225, a battery 230, a power manager 235, a communication unit 240, the touch sensor 250, a camera 260, a first projector 270 and a second projector 275, a first window 280 and a second window 285, and a controller 290.

The input/output module 210 is a device for receiving a user input, providing information to the user, receiving data from an external source, or outputting data to an external device, and includes at least one speaker 211, at least one microphone (MIC) 212, at least one button 213, a connector, a keypad, or a combination thereof.

A speaker 211 outputs sound corresponding to various data (e.g., wireless data, broadcast data, a digital audio file, a digital video file, and a picture) to the outside of the HMD device 100 under control of the controller 290, or sound corresponding to a function executed by the HMD device 100. One or more speakers 211 are formed in a proper position of the HMD housing 110. In FIGS. 1-3, two speakers 211 are disposed on an end portion of the first temple frame 120 and an end portion of the second temple frame 121, respectively.

The microphone 212 receives voice or sound from outside the HMD device 100, generates an electric signal, and outputs the generated electric signal to the controller 290. One or more microphones 212 may be formed in a proper position or proper positions of the HMD housing 110. In the current example, one microphone 212 is disposed on the outer surface of the front frame 115. Herein, the term "signal" may also be referred to as "data" and the term "data" may also be referred to as a "data signal".

The button 213 is provided to receive a user input, and is used to turn on/off the HMD circuit 101 or select and/or search for a menu item or an icon. The button 213 includes a power button, a volume button, a menu button, a home button, a back button, navigation buttons (a left button, a right button, an up button, and a down button), or a combination thereof. One or more buttons 213 may be formed in a proper position of the HMD housing 110. In FIGS. 1-3, the button 213 is disposed on the outer surface of the first temple frame 120.

A connector may be used as an interface for connecting the HMD device 100 with an external electronic device or a power source (not illustrated). The connector is connected with a connector of the electronic device directly or through a wired cable, and through such connector connection, the controller 290 transmits data stored in the memory 220 to the electronic device or receives data from the electronic device. The HMD device 100 receives power from a power source through the wired cable connected to the connector to charge the battery 230.

A keypad receives a key input from the user for control of the HMD device 100. The keypad includes a physical keypad formed in the HMD device 100, a virtual keypad displayed by the first projector 270 and/or the second projector 275, or a combination thereof.

The sensor unit 225 includes at least one sensor for detecting a state or a surrounding environment state of the HMD device 100. The sensor unit 225 includes a proximity sensor for detecting the user's proximity to the HMD device 100, a motion/orientation sensor for detecting a motion (e.g., rotation, acceleration, deceleration, and vibration) of the HMD device 100, an illumination sensor for detecting ambient illumination, or a combination thereof. The motion/orientation sensor includes at least one of an acceleration sensor, a gravity sensor, a geomagnetic sensor, a gyro sensor, a shock sensor, a Global Positioning System (GPS) module, and a compass sensor. The sensor unit 225 detects a state of the HMD device 100 and transmits a signal indicating the state of the HMD device 100 to the controller 290. The GPS module receives electric waves from a plurality of GPS satellites (not illustrated) around the Earth's orbit and calculates the position of the HMD device 100 by using a time of arrival of the electric waves from the GPS satellite (not illustrated) to the HMD device 100, for example. The compass sensor calculates a posture or orientation of the HMD device 100.

The power manager 235 supplies power to the HMD device 100 under control of the controller 290. The power manager 235 may be connected to one or more batteries 230. The power manager 235 may also supply power, which is received from an external power source (not illustrated) through the wired cable connected with the connector, to the HMD device 100.

The communication unit 240 is a wired or wireless communication device in a wired or wireless manner, which transmits data from the controller 290 or receives data from an external communication line or over the air and delivers the data to the controller 290 in a wired or wireless manner.

For example, the communication unit 240 includes at least one of a mobile communication module, a wireless Local Area Network (WLAN) module, and a short-range communication module, depending on its functionality.

The mobile communication module enables the HMD device 100 to communicate with an electronic device through a mobile communication network by using one or more antennas (not illustrated) under control of the controller 290. The mobile communication module transmits/receives a radio signal for voice communication, video communication, a Short Messaging Service (SMS), or a Multimedia Messaging Service (MMS) with a cellular phone (not illustrated), a smart phone (not illustrated), a tablet Personal Computer (PC) (not illustrated), or another communication device having a network address, such as an Internet Protocol (IP), or a phone number.

The WLAN module may be connected to the Internet under control of the controller 290 in a place where a wireless Access Point (AP, not illustrated) is installed. The WLAN module supports a WLAN standard (IEEE802.11x) of the Institute of Electrical and Electronics Engineers (IEEE).

The short-range communication module wirelessly performs short-range communication with an external short-range communication device under control of the controller 290. The short-range communication includes Bluetooth®, Infrared Data Association (IrDA), WiFi-Direct communication, Near Field Communication (NFC), or a combination thereof.

The touch sensor 250 transmits a signal corresponding to at least one touch input to the controller 290. The user touches the touch sensor 250 by using a finger, for example, or a touch input device such as a stylus, and the touch sensor 250 receives a user's touch input. The touch sensor 250 receives an input corresponding to continuous movement of a touch (such as a drag input). Touch input information includes touch coordinates and/or a touch state. The touch state includes a mouse down state for pressing the touch sensor 250, a mouse up state for removing a finger from the touch sensor 250, and a drag state for sliding while pressing the touch sensor 250. The controller 290 recognizes selection or movement of a menu item or an icon, or user input information such as a handwriting input from the touch input information, and performs a function (e.g., phone connection, camera photographing, message generation/view, and data transmission) corresponding to the user input information.

Herein, the touch includes a contactless (i.e., non-contact) touch, such as the touch sensor 250 and a touch input device being spaced apart from each other, as well as a contact between the touch sensor 250 and the touch input device. Such a contactless touch input may also be referred to as a hovering input. The touch sensor 250 may be implemented as a resistive type touch panel, a capacitive type touch panel, an infrared type touch panel, an acoustic wave type touch panel, an Electromagnetic Resonance (EMR) type touch panel, or a combination thereof.

The camera 260 includes a lens system and an image sensor, and may further include a flash. The camera 260 converts an optical signal input (or captured) through the lens systems into an electric image signal and outputs the electric image signal to the controller 290. The user captures a moving image or a still image through the camera 260. The camera 260 may also be provided to receive a user input corresponding to a user's motion or gesture.

The lens system forms an image of an object by converging light input from outside. The lens system includes at least one lens, which may be convex or aspheric. The lens system is symmetrical with respect to an optical axis that passes through a center thereof, and the optical axis is defined as a central axis. The image sensor detects an optical image formed by external light that is input through the lens system as an electric image signal. The image sensor includes a plurality of pixel units arranged in an M×N matrix, and each pixel unit includes a photodiode and at least one transistor. The pixel unit accumulates an electric charge generated by input light, and a voltage based on the accumulated electric charge indicates an illuminance of the incident light. When an image forming a still image or moving image is processed, image data output from the image sensor includes a set of voltages (i.e., pixel values) output from the pixel units, and the image data indicates one image (i.e., a still image) that includes M×N pixels. The image sensor is, e.g., a Charge-Coupled Device (CCD) image sensor or a Complementary Metal-Oxide Semiconductor (CMOS) image sensor.

The image sensor may operate all pixels thereof or only pixels of a Region Of Interest (ROI) according to a control signal received from the controller 290, and outputs image data output from the pixels to the controller 290.

The controller 290 processes a Graphic User Interface (GUI) configured by the controller 290 using an image input from the camera 260, an image stored in the memory 220, or data stored in the memory 220, in frame units, and outputs an image frame converted to fit for screen output characteristics (e.g., size, quality, and resolution) of the first projector 270 and/or the second projector 275 to the outside through the first projector 270 and/or the second projector 275, or stores the converted image frame in the memory 220. Herein, a GUI is an example of a virtual image formed by the first projector 270 and/or the second projector 275, but the expression "a virtual image" may also be used instead of the GUI and the virtual image includes a virtual object that is not a real object, such as a GUI or still image content.

The controller 290 provides a GUI corresponding to various services (e.g., phone conversation, data transmission, broadcasting, and photographing) to the user through the first projector 270 and/or the second projector 275. The controller 290 provides a still image or a moving image to the user through the GUI. That is, in the present invention, the GUI may illustrate a screen expressed with a still image or a moving image.

The first projector 270 and the second projector 275 have the same structure, and each projects light that forms the virtual image provided by the controller 290 to the user's eyes through the first window 280 and the second window 285, respectively.

Figure 4:
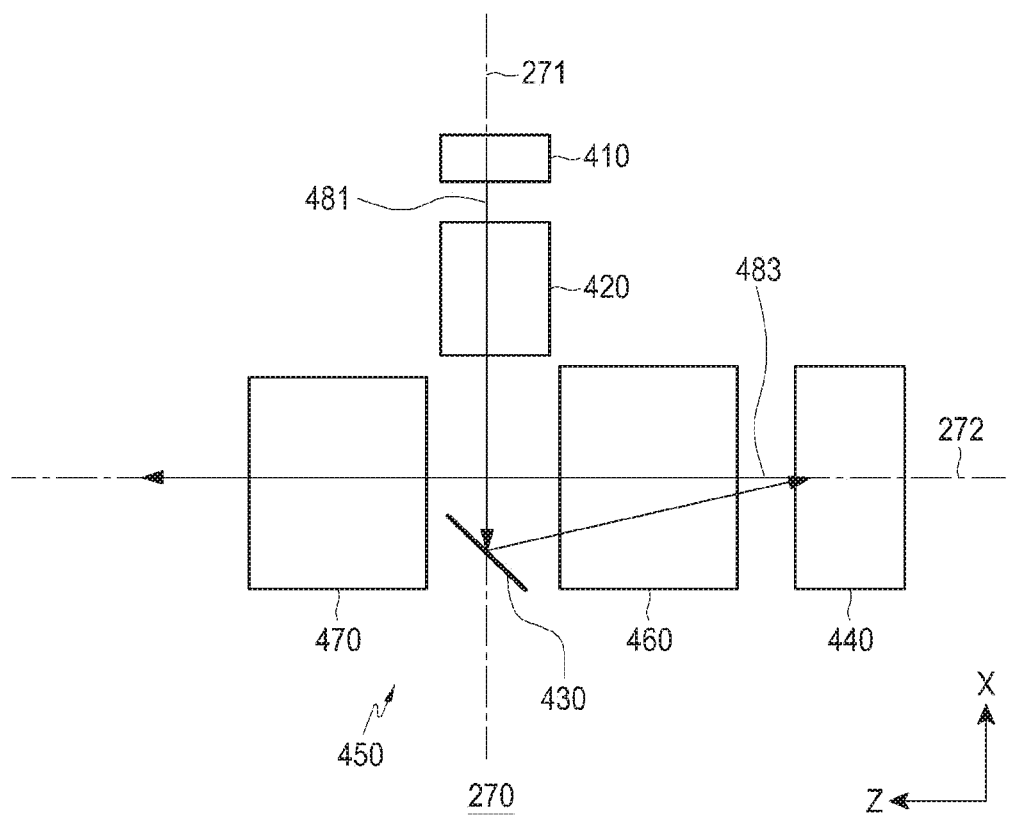
FIG. 4 illustrates a schematic structure of a first projector according to an embodiment of the present invention.

FIG. 4 illustrates a schematic structure of the first projector 270.

The first projector 270 includes a light source 410 for outputting light, an illumination optical system 420 for illuminating the display device 440 with light output from the light source 410, a mirror 430 for reflecting light that passes through the illumination optical system 420, the display device 440 for reflecting the light reflected by the mirror 430 in pixel units to form a virtual image, and a projection optical system 450 for projecting the light reflected from the display device 440 to the outside.

The illumination optical system 420 has a first optical axis 271 that is parallel with an X-axis, and includes at least one collimation lens, at least one filter, at least one equalization lens, a condensing lens, or a combination thereof.

Optical elements such as a lens, prism, and filter of the illumination optical system 420 are aligned with the first optical axis 271. Generally, an optical axis does not experience an optical change, even when a corresponding optical system rotates around the axis. Alignment with an optical axis indicates that a curvature center of an optical element of the optical system is positioned on the optical axis or a symmetric point (i.e., a symmetric center) or a center point of the optical element is positioned on the optical axis.

The light source 410 outputs light that travels along the first optical axis 271. At least one Light Emitting Diode (LED) for outputting white light, primary light (e.g., blue light or green light), or a combination of primary lights is used as the light source 410.

The illumination optical system 420 collimates, filters, and/or condenses light input from the light source 410, and outputs the processed light to the mirror 430.

The mirror 430 reflects the input light passing through the illumination optical system 420 toward the display device 440. A high-reflectivity dielectric layer or metallic layer may be deposited on a substrate of the mirror 430.

The display device 440 displays an image in pixel units according to data input from the controller 290, and the display device 440 includes pixel elements corresponding to a preset resolution and displays an image through on/off of the pixel elements. A Digital Micro-Mirror Device (DMD) including micro mirrors arranged in an M×N (e.g., 1280×720 or 854×480) matrix structure, for example, may be used as the display device 440. Each micro mirror rotates to a position corresponding to an on or off state according to a drive signal, and reflects incident light incident at an angle that allows a display to the outside in the on state and reflects incident light at an angle that does not allow a display to the outside in the off state.

The projection optical system 450 has a second optical axis 272 that is parallel with a Z-axis, and includes a relay lens 460 and a projection lens 470 which are both aligned with the second optical axis 272.

The relay lens 460 causes light reflected from the mirror 430 to be matched to the display device 440, considering overfill. That is, the relay lens 460 causes the light reflected from the mirror 430 to be incident to an area that is equal to or larger than an area occupied by pixel devices of the display device 440.

The relay lens 460 also receives the light reflected from the display device 440, and outputs the light after reducing the beam spot size of the light. The light reflected from the display device 440 has a large beam spot size, and thus a large light loss may occur due to light that fails to be delivered to the projection lens 470. Therefore, the relay lens 460 collects the light reflected from the display device 440 and reduces the beam spot size of the light, thereby delivering as much light as possible to the projection lens 470.

The projection lens 470 receives light having a beam spot size that is adjusted from the relay lens 460, collimates or condenses the received light, and projects the light to the outside.

Referring back to FIG. 3, the first window 280 and the second window 285 have the same structure, and each has a transmissivity that varies under control of the controller 290 and has a hologram pattern which functions as a concave mirror.

Figure 5:
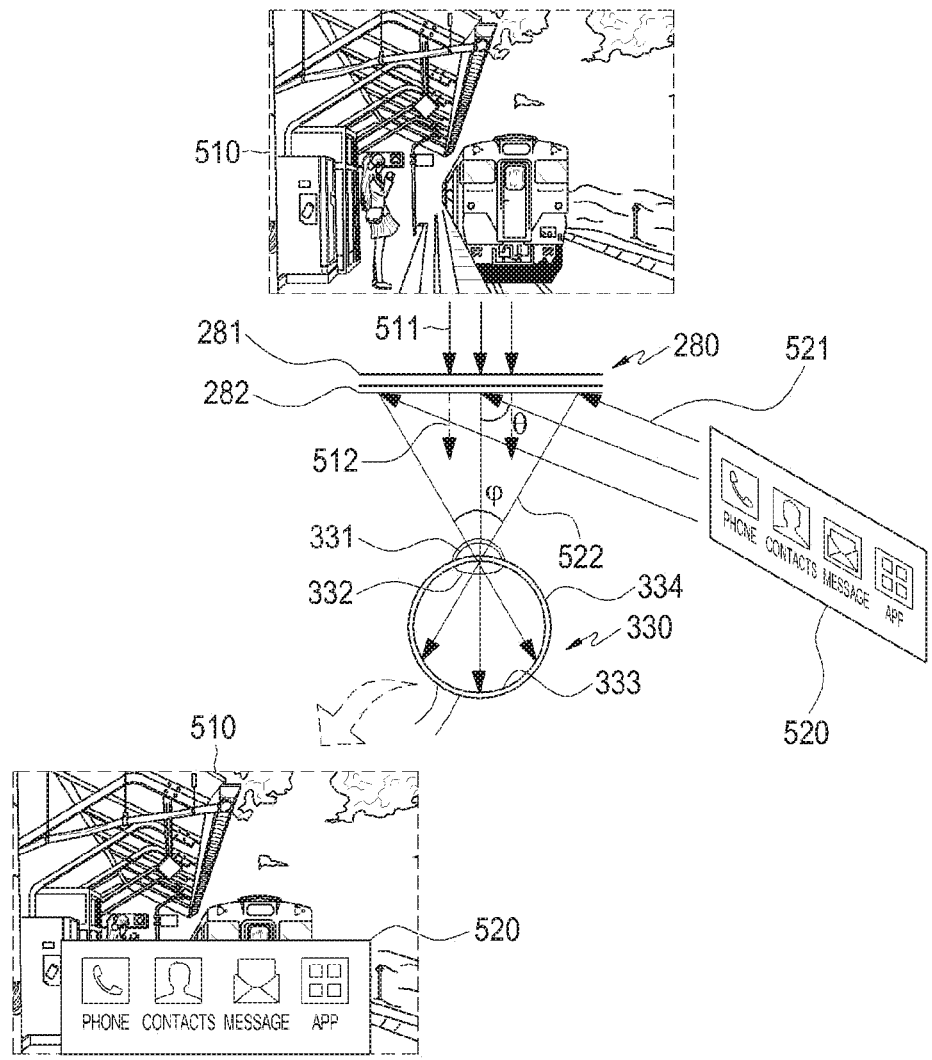
FIG. 5 illustrates a structure and a function of a first window according to an embodiment of the present invention.

FIG. 5 illustrates a structure and a function of the first window 280 according to an embodiment of the present invention.

The first window 280 includes first glass 281 having a transmissivity that varies according to an applied signal, and a first Holographic Optical Element (HOE) 282 which functions as a concave mirror. Likewise, the second window 285 includes second glass having a transmissivity that is controlled and a second HOE which functions as a concave mirror.

The first window 280 passes therethrough ambient light 511 input from the outside, and reflects and condenses first projection light 521 input from the first projector 270.

The ambient light 512 that passes through the first window 280 and the first projection light 522 reflected by the first window 280 are input to the left eye 330. An ambient landscape image 510 formed by the ambient light 512 and a GUI 520 formed by the reflected first projection light 522 are formed in an overlapping manner on a retina 333 of the left eye 330. That is, the user sees an image formed by overlapping of the ambient landscape image 510 and the GUI 520, and to the user, the GUI 520 may be seen as if a transparent layer (i.e., a GUI) overlaps an ambient landscape. The GUI 520 includes menu items (or icons) such as "Phone", "Contacts", "Message", and "Applications". In FIG. 5, the GUI 520 is displayed opaque, but the GUI 520 may be displayed partially or entirely transparent to allow the ambient landscape image 510 under the GUI 520 to be shown through the GUI 520.

The first projection light 521 output from the first projector 270 is parallel light (that is, collimated light) having a particular wavelength λ, and the first projection light 521 is incident to the first HOE 282 while forming a particular angle θ with a normal line of the first HOE 282. The first HOE 282 is an element having wavelength selectivity, such that the first HOE 282 reflects and condenses light having the particular wavelength λ (i.e., the first projection light 521) and passes therethrough light having wavelength other than the particular wavelength λ (i.e., the ambient light 511) without converging the light.

The first HOE 282 reflects and condenses the input first projection light 521, and the first projection light 522 reflected from the first HOE 282 converges to the left eye 330 spaced apart from the first HOE 282 by a particular distance, that is, an eye relief, preferably to a pupil 331 or a crystalline lens 332 of the left eye 330. The converging first projection light 522 has a particular convergence angle or viewing angle φ. The crystalline lens 332 adjusts a focus of light incident to the eye, and the passing ambient light 512 converges into an eyeball 334 by the crystalline lens 332, thus forming the ambient landscape image 510 on the pupil 333. The reflected first projection light 522 converges to the pupil 331 or the crystalline lens 332, such that the first projection light 522 is projected on the pupil 333 without converging by the crystalline lens 332, thus forming the GUI 520.

Although the first projection light 521 incident to the first HOE 282 is illustrated as being parallel light, the present invention is not limited thereto, such that the first projection light 522 reflected by the first HOE 282 may be light or convergence light instead of parallel light, such that the reflected first projection light 522 converges to the pupil 331 or the crystalline lens 332.

If the reflected first projection light 522 is converged by the crystalline lens 332, a virtual object (or an object) of a virtual image such as a GUI may not be clearly imaged on the retina of a user when the user who wears the HMD device 100 adjusts the focus of the eyes to see a real object of an ambient landscape. In this situation, the user fails to clearly see the real object and the virtual object concurrently, thus failing to recognize intended augmented reality.

The HMD device 100 according to an embodiment of the present invention converges projection light for forming a virtual image to a pupil or a crystalline lens, thus solving a conventional problem. That is, the HMD device 100 causes the projection light to converge to or close to the crystalline lens, thereby minimizing a focus change of the projection light, caused by the crystalline lens.

As such, when the projection light converges to the pupil or the crystalline lens, the projection light is directly projected to the retina regardless of focus adjustment of the crystalline lens of the eye. A virtual image projected on the retina is recognized by the user as a clear image, irrespective of focus adjustment and aberration of the crystalline lens.

Figure 6:
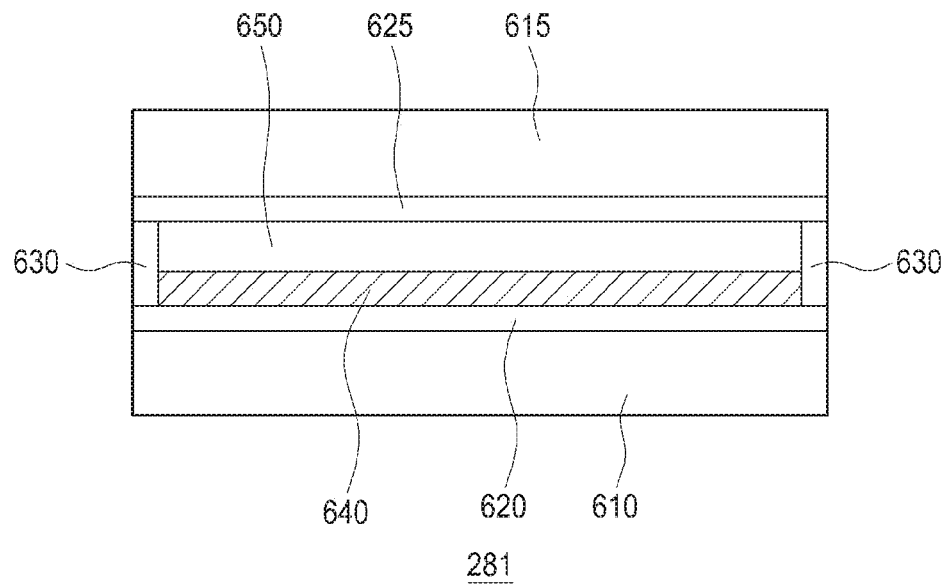
FIG. 6 illustrates a structure of first glass according to an embodiment of the present invention.

The first HOE 282 may have a focal length corresponding to a distance between the pupil 331 or the crystalline lens 332 and the first HOE 282, and in this case, the virtual image is clearly formed on the retina of the eye regardless of focus adjustment of the eye FIG. 6 illustrates a structure of the first glass 281 according to an embodiment of the present invention. The first glass 281 has a transmissivity that varies according to a signal or voltage applied by the controller 290.

The first glass 281 may use, as examples, electrochromic glass, a Suspended Particle Device (SPD), or Liquid Crystal (LC). In some cases, the first glass 281 may use photochromic glass or thermochromic glass that may not be actively controlled by an applied signal, and that has a transmissivity changing in reaction with light of a particular wavelength or a temperature change.

The first glass 281 is manufactured in various manners, such as by applying a transmissivity-adjustable material onto glass or by attaching a transmissivity-adjustable thin film onto glass.

In the current example, the first glass 281 uses electrochromic glass.

The first glass 281 includes an insulating first substrate 610 and an insulating second substrate 615, a conductive first electrode 620 stacked on a top surface of the first substrate 610, a conductive second electrode 625 stacked on a bottom surface of the second substrate 615, an insulating spacer 630 for separating the first substrate 610 from the second substrate 615 and sealing a space between the first substrate 610 and the second substrate 615, and an electrochromic layer 640 and an electrolyte 650 that are filled in the space between the first substrate 610 and the second substrate 615.

Each of the first substrate 610 and the second substrate 615 is made of transparent glass or plastic, and the plastic is one of polyacrylate, polyethylene etherphthalate, polyethylene naphthalate, polycarbonate, polyarylate, polyether imide, polyether sulfone, and polyimide, for example.

The first electrode 620 is made of a transparent conductor, and includes, e.g., an inorganic conductive material such as Indium Tin Oxide (ITO), Fluorine Tin Oxide (FTO), or Antimony Doped Tin Oxide (ATO), or an organic conductive material such as polyacetylene or polythiophene.

The second electrode 625 is made of a transparent or an opaque conductive material, and includes, e.g., ITO, FTO, metal such as Al, ATO, or a combination thereof.

The electrochromic layer 640 including an electrochromic material is disposed on the first electrode 620, in the form of a film.

The first substrate 610 and the second substrate 615 are fixed by the spacer 630, and the electrolyte 650 is filled between the first substrate 610 and the second substrate 615. The electrolyte 650 provides an oxidation/reduction material that reacts with an electrochromic material, and is a liquid electrolyte or a solid high-polymer electrolyte. The liquid electrolyte may use, for example, a solution made by dissolving lithium salt such as LiOH or LiClO$_4$, potassium salt such as KOH, and sodium salt such as NaOH in a solvent. The solid electrolyte uses, for example, poly(2-acrylamino-2-methylpropane sulfonic acid) or poly(ethylene oxide)).

The material of the electrochromic layer 640, that is, the electrochromic material includes a metal-organic complex in which metal and an organic compound having a functional group capable of forming coordination with the metal are combined. The metal includes light metal, transition metal, lanthanide metal, alkali metal, or a combination thereof, and the metal includes Beryllium (Be), Barium (Ba), Copper (Cu), Zinc (Zn), Cerium (Ce), Magnesium (Mg), Aluminum (Al), Titanium (Ti), or a combination thereof. The functional group includes a carboxyl group, a pyridine group, an imidazole group, or a combination thereof. The organic compound includes a viologen derivative, an anthraquinone derivative, or a combination thereof.

Figures 7A, 7B:
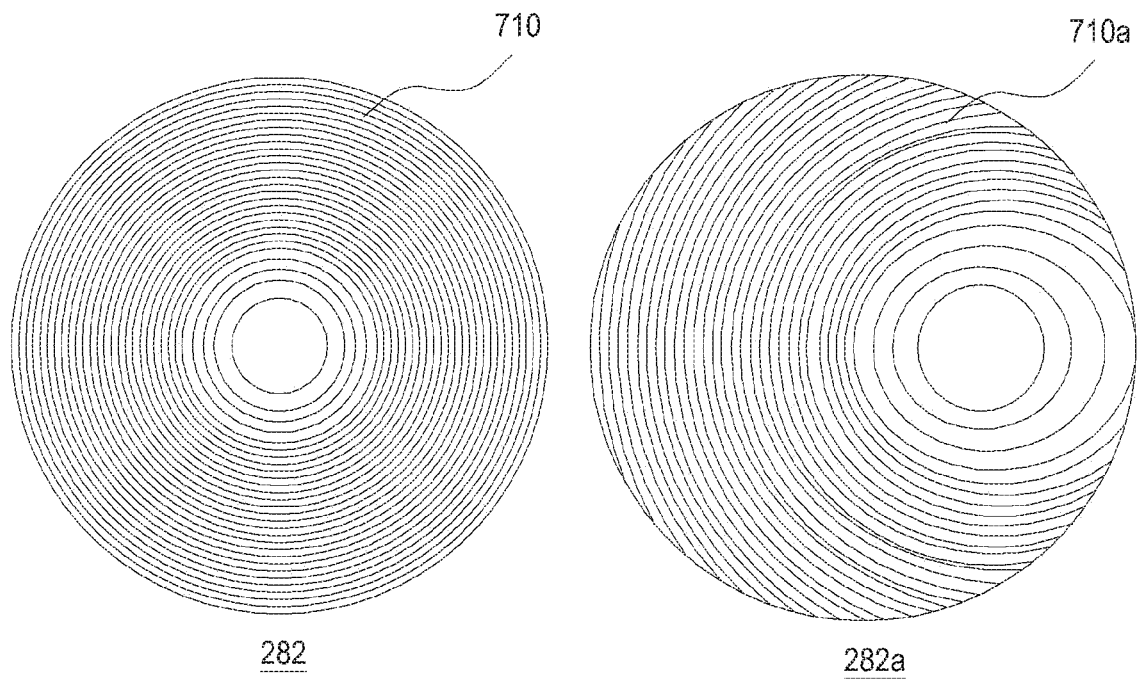
FIGS. 7A and 7B illustrate holographic patterns of first Holographic Optical Elements (HOEs) according to an embodiment of the present invention.

FIGS. 7A and 7B illustrate holographic patterns 710 and 710a of first HOEs 282 and 282a according to an embodiment of the present invention.

The first HOEs 282 and 282a include the holographic patterns 710 and 710a including multiple concentric circles. The first HOEs 282 and 282a includes, for example, a transparent substrate and a holographic pattern layer stacked on the transparent substrate.

FIG. 7A illustrates an example of the first HOE 282 in which the center of the concentric circles is in the center of the holographic pattern 710, and FIG. 7B illustrates an example of the first HOE 282a in which the center of the concentric circles is in an edge of the holographic pattern 710a.

Referring back to FIG. 3, the controller 290 controls the overall operation of the HMD device 100, and controls other components in the HMD device 100 to provide a method for providing a virtual image. The controller 290 includes a single-core, dual-core, triple-core, or quad-core processor. The controller 290 receives a broadcast signal (e.g., a TeleVision (TV) broadcast signal, a radio broadcast signal, or a data broadcast signal) and broadcast additional information (e.g., an Electronic Program Guide (EPG) or an Electronic Service Guide (ESG)) transmitted from a broadcasting station through the communication unit 240.

The controller 290 plays a digital audio file (e.g., a file having a file extension such as 'mp3', 'wma', 'ogg', or 'wav') stored in the memory 220 or received through the communication unit 240 through the speaker 211. The controller 290 plays a digital video file (e.g., a file having a file extension such as 'mpeg', 'mpg', 'mp4', 'avi', 'mov', or 'mkv') stored in the memory 220 or received through the communication unit 240 through the first projector 270 and/or the second projector 275. The controller 290 displays image data (such as a GUI) configured by the controller 290 to the user through the first projector 270 and/or the second projector 275 by using data stored in the memory 220 or received through the communication unit 240 according to a user command, a selection of a menu item or an icon, or event information input through the sensor unit 225, the input/output module 210, the camera 260, or the touch sensor 250. The image is a still or moving image.

The memory 220 stores a signal or data under control of the controller 290. The memory 220 stores a control program and applications for the HMD device 100 or the controller 290.

Herein, the term "memory" includes a Read Only Memory (ROM) or a Random Access Memory (RAM) in the controller 290 or a memory card (not shown) (e.g., a Secure Digital (SD) card or a memory stick), a non-volatile memory, a volatile memory, or a Solid State Drive (SSD) mounted on the HMD device 100.

FIGS. 8A through 9B describe transmittance control of the HMD device 100. The first window 280 and the second window 285 control transmissivities under the control of the controller 290, thus improving visibility of the virtual image.

Since the first window 280 and the second window 285 adjust transmissivities according to a change of an applied voltage, output of the first projector 270 and/or the second projector 275 for forming a virtual image is reduced, thus reducing total power consumption and heat emission of the first projector 270 and/or the second projector 275 and increasing the lifespan of the battery 230 of the HMD device 100.

FIGS. 8A and 8B illustrate when the user watches a TV in an indoor environment.

In an indoor environment having a low ambient illumination, visibility of the first GUI 820 and visibility of the second GUI 825 formed by the first projector 270 and the second projector 275 are high, and thus transmissivities of the first window 280 and the second window 285 are set relatively high. The controller 290 sets the transmissivities of the first window 280 and the second window 285 to maximal values or to 30% or higher, for example. The first GUI 820 and the second GUI 825 are the same as each other except that they are displayed in different positions.

FIGS. 9A and 9B illustrate when the user views an ambient landscape in an outdoor environment.

In an outdoor environment having a high ambient illumination, visibility of the first GUI 920 and visibility of the second GUI 925 formed by the first projector 270 and the second projector 275 are low, such that the transmissivities of the first window 280 and the second window 285 are set relatively low. The controller 290 sets the transmissivities of the first window 280 and the second window 285 to minimal values or to 10% or lower, for example.

In FIGS. 8A through 9B, the first GUIs 820 and 920 and the second GUIs 825 and 925 are not images that are formed on the first window 280 and the second window 285, but are images shown to the user. In FIGS. 8A through 9B, each GUI is displayed opaque, but the GUI may be displayed partially or entirely transparent to allow the ambient landscape under the GUI to be shown through the GUI.

The controller 290 measures an ambient illumination through the sensor unit 225, increases the transmissivities of the first window 280 and the second window 285 if the ambient illumination is lower than a reference illumination or reference illumination range (i.e., the first window 280 and the second window 285 have relatively high transmissivities), and reduces the transmissivities of the first window 280 and the second window 285 if the ambient illumination is higher than the reference illumination or reference illumination range (i.e., the first window 280 and the second window 285 have relatively low transmissivities). The reference illumination may be a currently set ambient illumination. The controller 290 may maintain the transmissivities of the first window 280 and the second window 285 if there is no change in the ambient illumination. The controller 290 stores the currently set ambient illumination and/or transmissitivies in the memory 220.

The memory 220 stores a data table indicating ambient illumination values and transmissitivies (and/or applied voltage values of the first window 280 and the second window 285) that correspond to each other. The controller 290 calculates a target transmissivity (and/or an applied voltage value of each of the first window 280 and the second window 285) based on the data table through mapping, interpolation or equation calculation. The controller 290 applies a voltage corresponding to the calculated transmissivity to each of the first window 280 and the second window 285, which are glass, thereby adjusting the transmissitivies of the first window 280 and the second window 285 to the target transmissivity.

Figure 10:
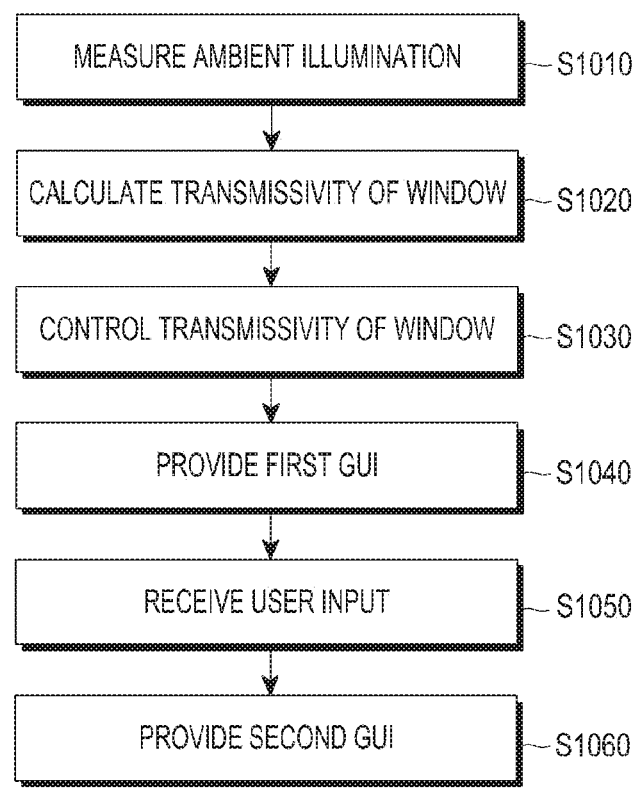
FIG. 10 illustrates a method for providing a virtual image according to an embodiment of the present invention.

FIG. 10 illustrates a method for providing a virtual image according to an embodiment of the present invention.

In FIG. 10, a GUI is illustrated as an example of the virtual image.

In step S1010, the controller 290 measures an ambient illumination by using the sensor unit 225 or the camera 260. The sensor unit 225 includes an illumination sensor, and an ambient illumination value measured by the sensor unit 225 is output to the controller 290 from the sensor unit 225. The camera 260 converts light that forms an ambient landscape input (or captured) through a lens system into an electric image signal and outputs the electric image signal to the controller 290, such that the controller 290 may measure the ambient illumination by using a brightness of the light.

In step 1020, the controller 290 calculates a target transmissitivity (and/or an applied voltage value of each of the first window 280 and the second window 285) corresponding to the ambient illumination value, by using a data table including ambient illumination values and transmissivities that are stored in the memory 220 corresponding to each other.

In step S1030, the controller 290 applies a voltage corresponding to the calculated target transmissivity to glass of each of the first window 280 and the second window 285, thus adjusting the transmissitivies of the first window 280 and the second window 285 to the calculated target transmissivity. That is, the controller 290 controls the first window 280 and the second window 285 such that the transmissivities of the first window 280 and the second window 285 are equal to the calculated target transmissivity.

In step S1040, the controller 290 configures a first GUI by using data stored in the memory 220 and displays the configured first GUI to the user through the first projector 270 and/or the second projector 275. The first GUI may be a basic GUI that is initially displayed to the user when the HMD device 100 is powered on or starts, and e.g., the GUI 520 illustrated in FIG. 5 may be displayed to the user.

In step S1050, the controller 290 receives a user input through the input/output module, 210, the touch sensor 250, the camera 260, or the communication unit 240. The user selects the button 213 or an icon or a menu item, input a voice command through the microphone 212, performs a gesture or a motion input through the camera 260, or wirelessly inputs a particular command through the communication unit 240. The command is an execution command for an application, which for example is an arbitrary application such as a voice recognition application, a schedule management application, a document generation application, a music application, an Internet application, a map application, a camera application, an e-mail application, an image editing application, a search application, a file explorer application, a video application, a game application, a Social Networking Services (SNS) application, a phone application, or a message application. The gesture or motion input indicates that the user draws a trajectory of a pattern such as a circle, a triangle, or a rectangle toward the camera 260 with a hand or a finger. Although an application is executed according to a user input in this example, the application may also be automatically executed upon occurrence of an event such as message reception, call reception, or an alarm event.

In step S1060, the controller 290 configures a second GUI by using data stored in the memory 220 according to a user input and displays the configured second GUI to the user through the first projector 270 and/or the second projector 275. The second GUI may be an application window.

Changing the first GUI into the second GUI may be described as updating the GUI according to the user input.

In the following description of examples of the method for providing a virtual image, only the GUI displayed by the first projector 270 and the first window 280 is illustrated, but such a description may be equally applied to the second GUI displayed by the second projector 275 and the second window 285.

Figure 11:
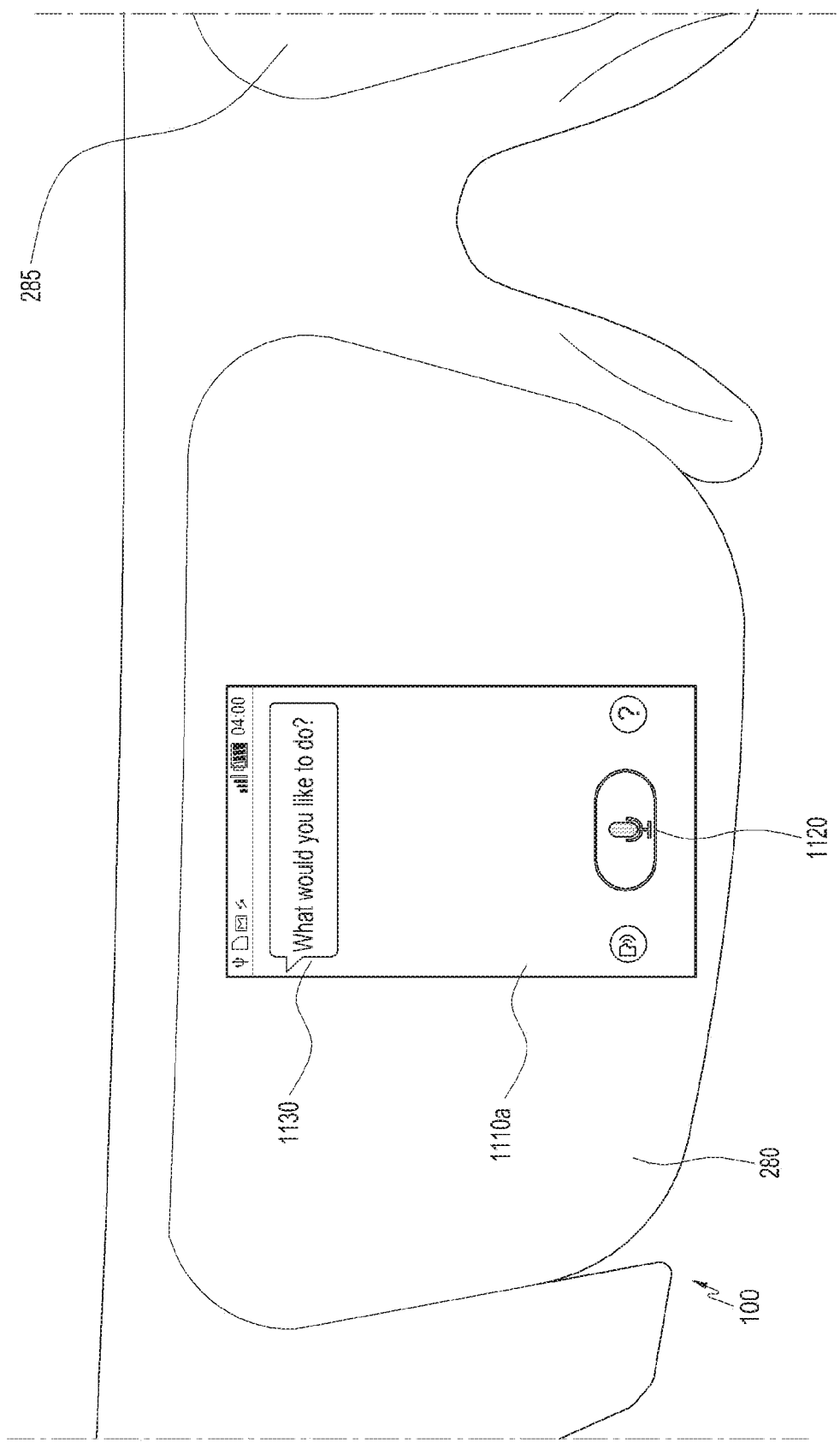
FIGS. 11 through 13 are views describing a first example of a method for providing a virtual image according to an embodiment of the present invention.
Figure 12:
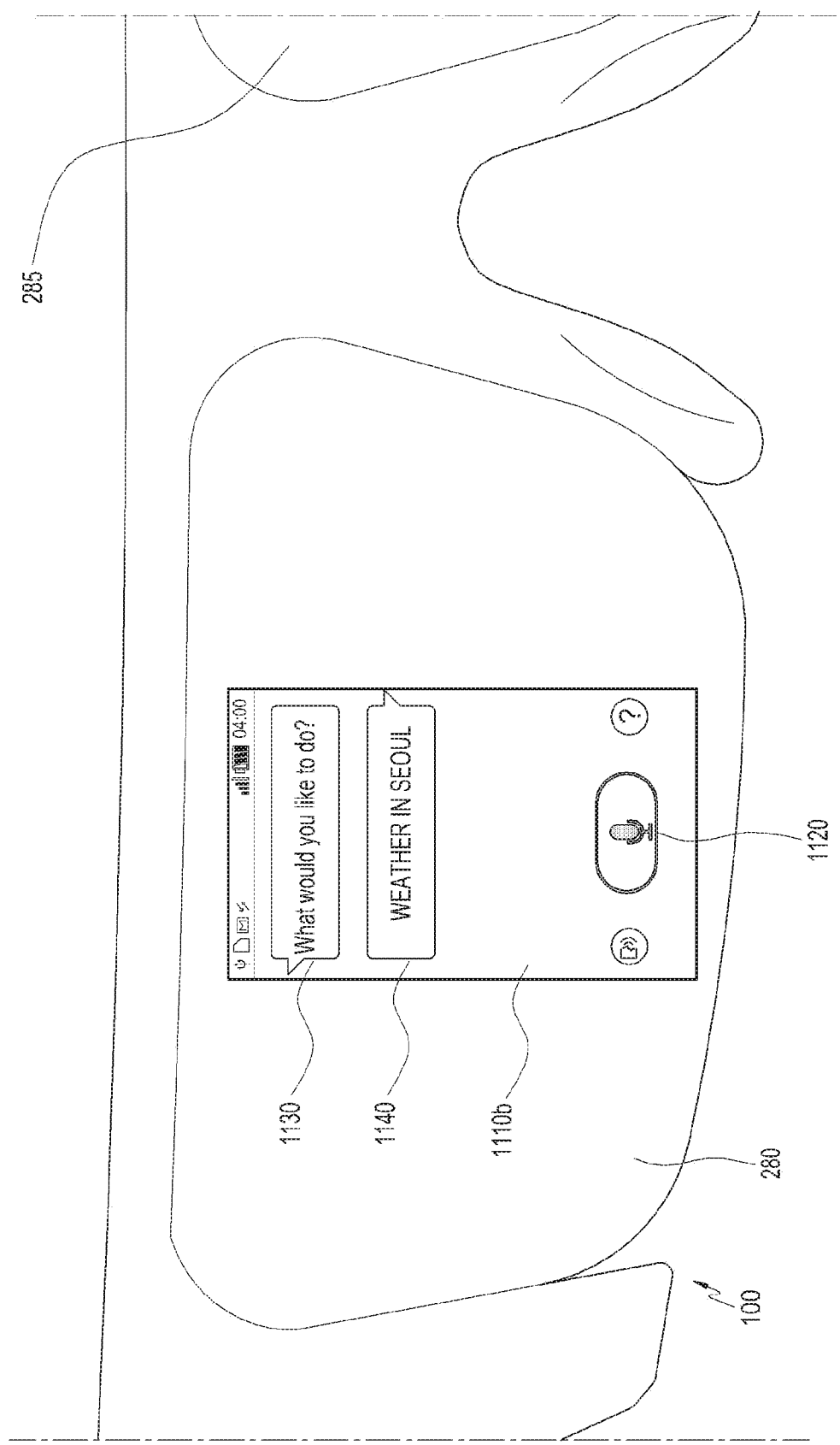
Figure 13:
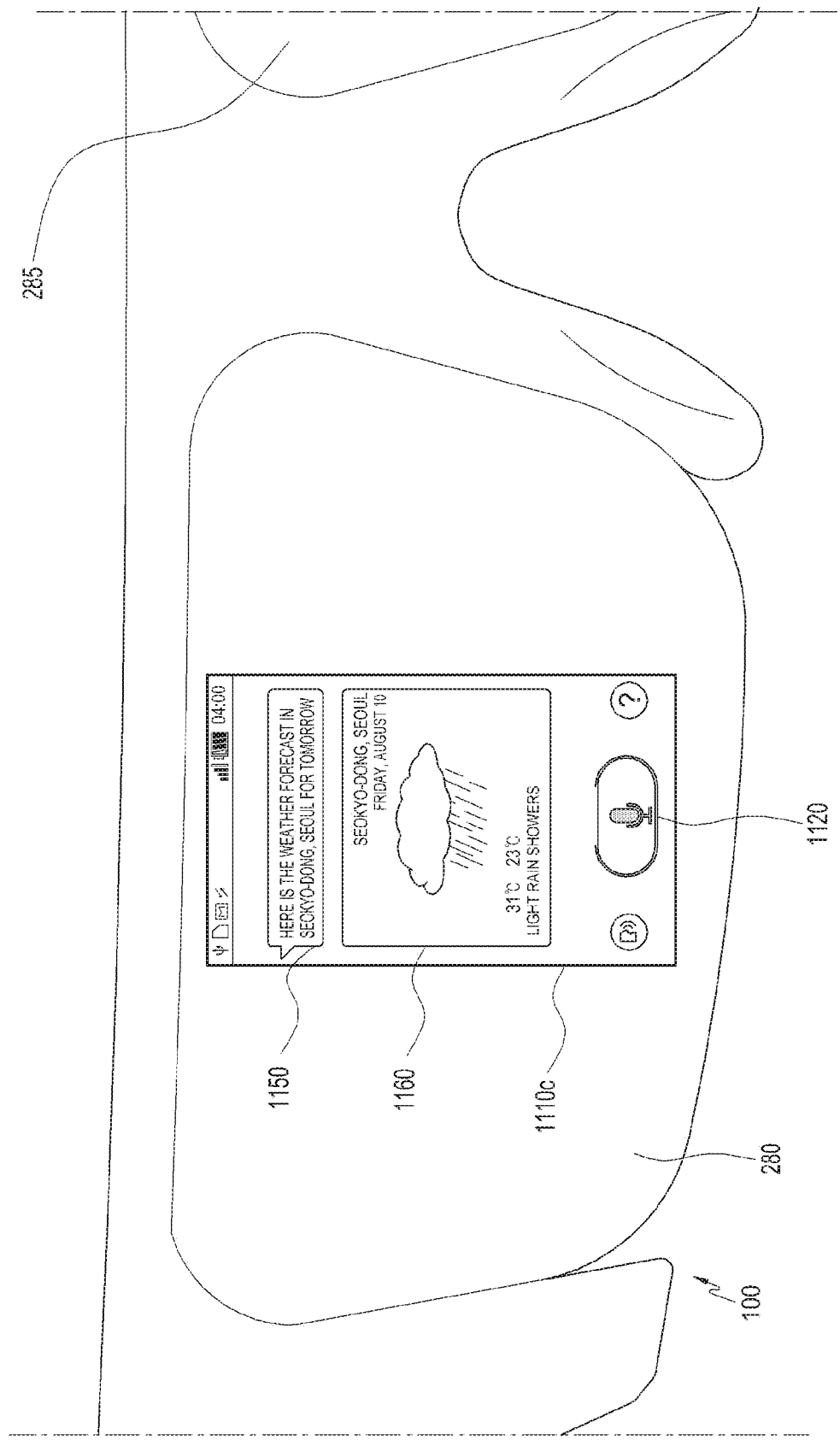

FIGS. 11 through 13 describe a first example of the method for providing a virtual image according to an embodiment of the present invention.

Referring to FIG. 11, the user selects the button 213, an icon or a menu item, inputs a voice command, a gesture, a motion, or a touch pattern, and the controller 290 executes a voice recognition application corresponding to the user input. The controller 290 configures an application window 1110a by using data stored in the memory 220 and displays the configured application window 1110a to the user through the first projector 270 and the first window 280.

In the following examples illustrated in FIGS. 11 through 13, the voice recognition application window 1110a is shown to the user, and is not displayed on the first window 280.

While the voice recognition application and another application are illustrated as the subjects of program operations, that the controller 290 may also perform the program operations.

FIG. 11 illustrates an initial screen of the voice recognition application.

Once the voice recognition application is initially driven, a use guide phrase 1130 such as "What would you like to do?" is displayed on the application window 1110a.

A voice recognition button 1120 for executing a voice recognition mode is disposed in a lower portion of the voice recognition application window 1110a. A voice guide button for guiding a using method with voice may be disposed in a side of the voice recognition button 1120. A help button for displaying examples of the using method may be disposed in the other side of the voice recognition button 120.

Referring to FIG. 12, the user inputs a desired command, such as "Weather in Seoul" in the current example, by voice through the microphone 212.

The voice recognition application recognizes a voice command input by the user and converts the voice command into text data 1140.

The voice recognition application displays the text data 140 on an application window 1110b.

Referring to FIG. 13, the voice recognition application searches for weather in Seoul by using the text data 1140 as a search word, and displays search results 1150 and 1160, that is, a guide phrase 1150 and weather information 1160, on an application window 1110c. The voice recognition application may search for weather in Seoul by using the text data 1140 and a current location (e.g., Seokyo-dong) of the HMD device 100 as search words.

The voice recognition application converts the text data 1140 into voice data, transmits the voice data to a voice recognition server, and provides a response result received from the voice recognition server to the user. Alternatively, the voice recognition application transmits the text data 1140 to the voice recognition server and provides a response result received from the voice recognition server to the user.

Figure 14:
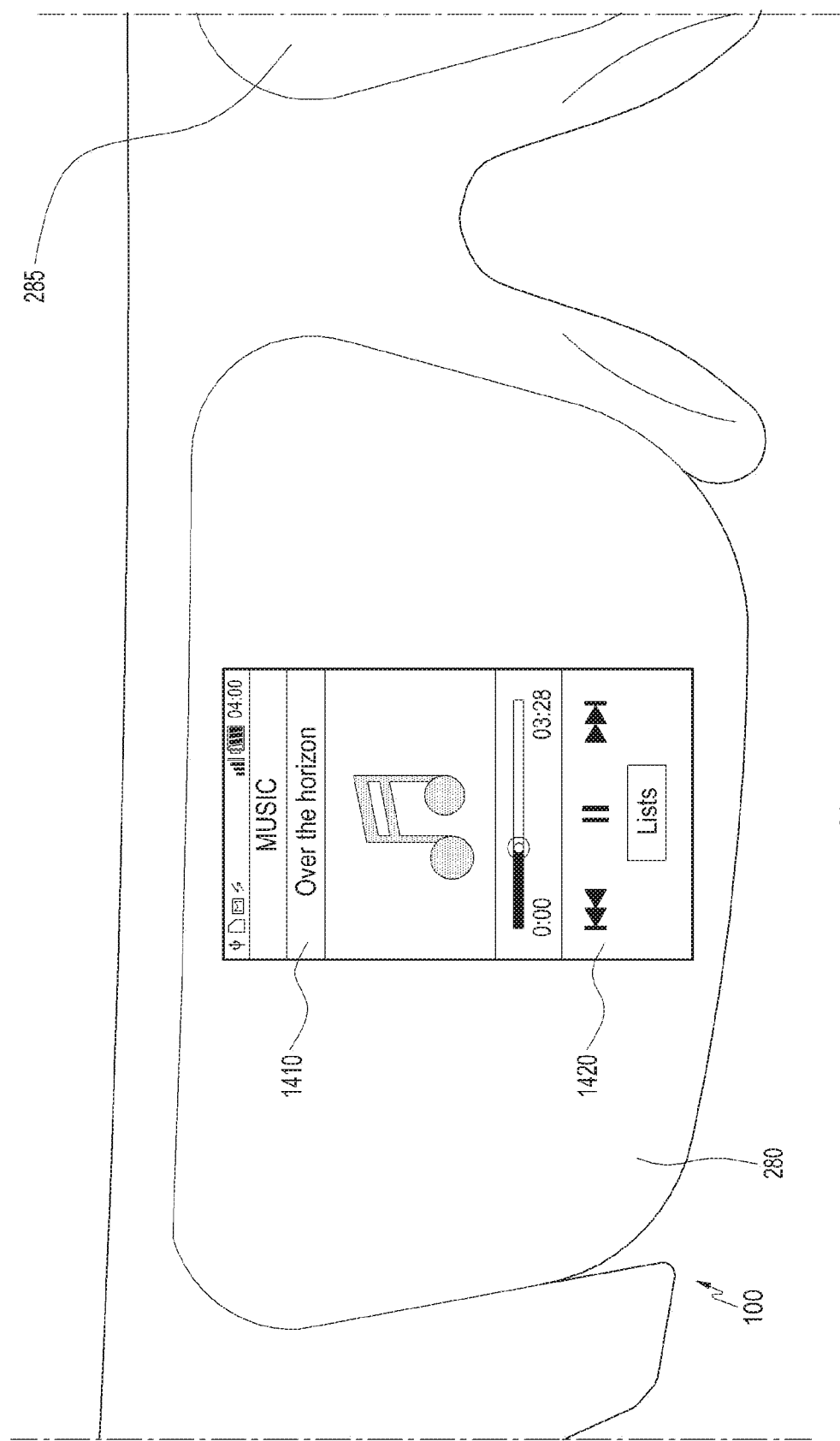
FIG. 14 illustrates a second example of a method for providing a virtual image according to an embodiment of the present invention.

FIG. 14 illustrates a second example of the method for providing a virtual image according to an embodiment of the present invention.

Referring to FIG. 14, the user selects a button 213, an icon or a menu item, or inputs a voice command, a gesture, motion, or a touch pattern through the input/output module 210 or the camera 260, and the controller 290 executes a music application corresponding to the user input. The controller 290 configures a music application window 1410 by using data stored in the memory 220, and displays the music application window 1410 to the user through the first projector 270 and the first window 280.

The music application plays a music file according to a user's selection or a music file that is set by default, and displays a title and a playtime of a currently played music file on the music application window 1410. In a lower portion of the music application window 1410, a menu item 1420 such as pause, fast-forward, and rewind and a lists button for displaying a selectable music list may be provided.

Figure 15:
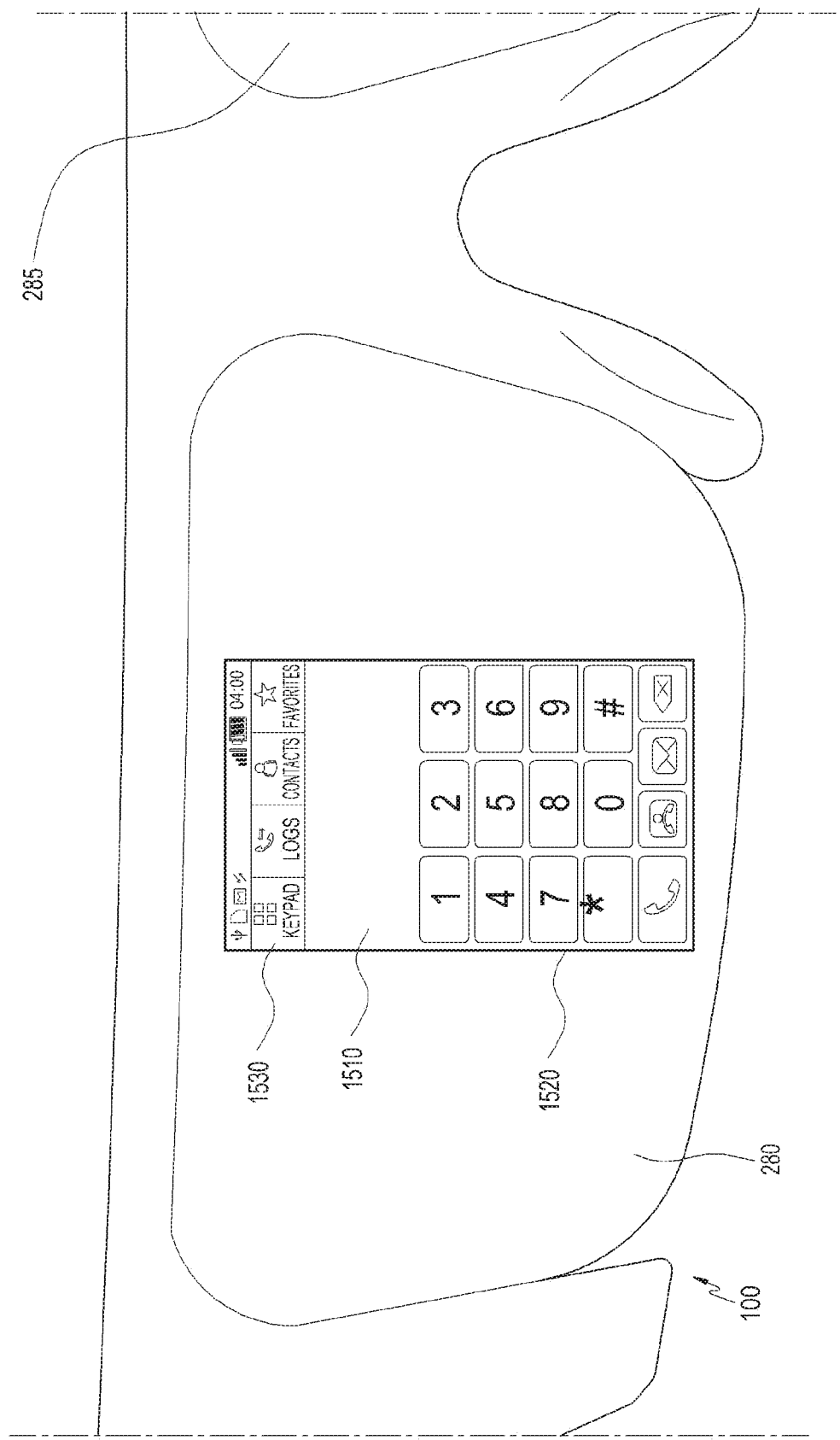
FIG. 15 illustrates a third example of a method for providing a virtual image according to an embodiment of the present invention.

FIG. 15 illustrates a third example of the method for providing a virtual image according to an embodiment of the present invention.

Referring to FIG. 15, the user selects the button 213, an icon or a menu item, or inputs a voice command, a gesture, a motion, or a touch pattern through the touch sensor 250, the input/output module 210 or the camera 260, and the controller 290 executes a call application corresponding to the user input. The controller 290 configures a call application window 1510 by using data stored in the memory 220, and displays the configured call application window 1510 to the user through the first projector 270 and the first window 280.

The call application displays a keypad 1520 for inputting a phone number and menu items 1530 such as keypad conversion, recent logs, contacts, and favorites on the call application window 1510.

Figure 16:
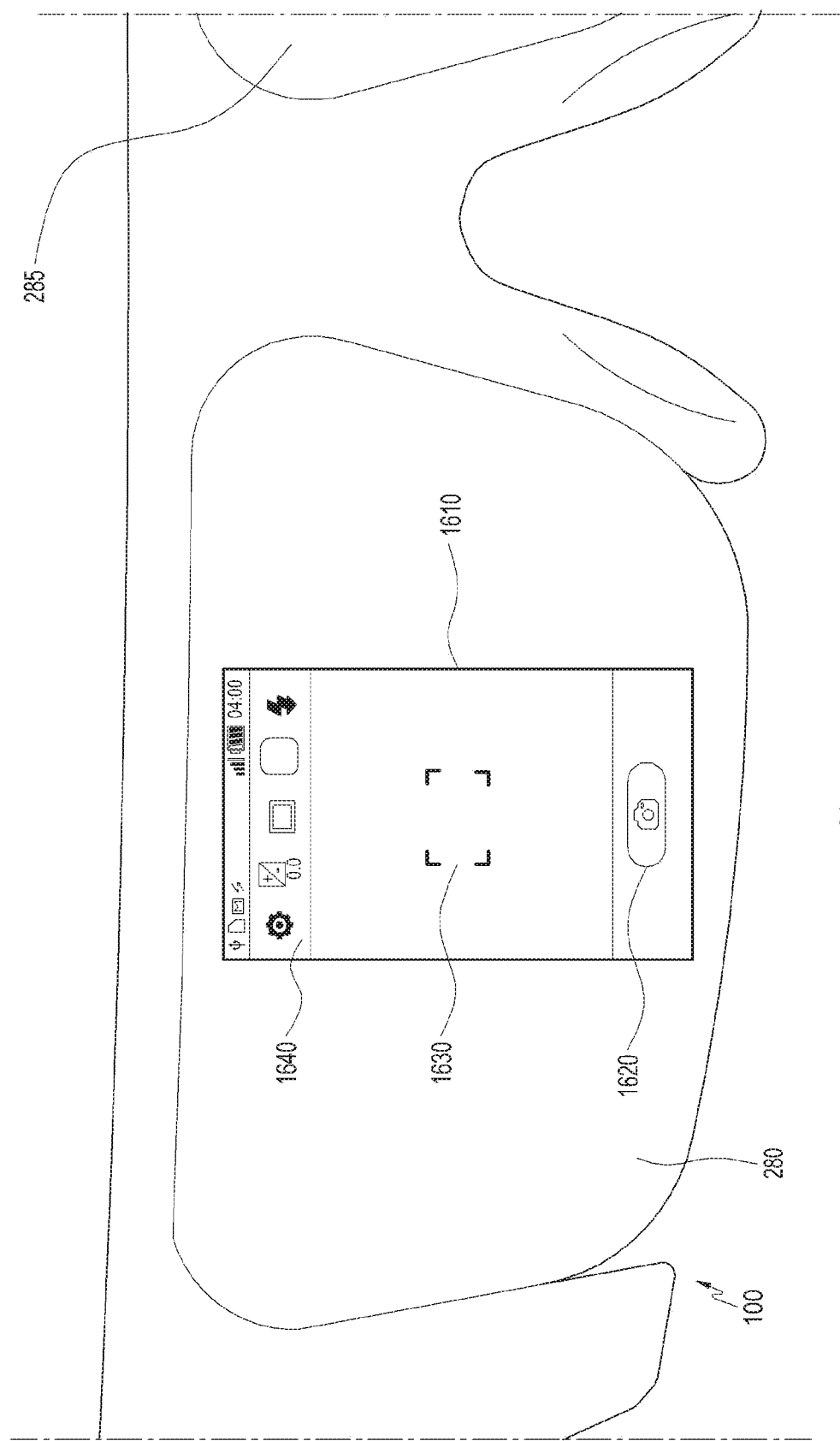
FIG. 16 illustrates a fourth example of a method for providing a virtual image according to an embodiment of the present invention.

FIG. 16 illustrates a fourth example of the method for providing a virtual image according to an embodiment of the present invention.

Referring to FIG. 16, the user selects the button 213, an icon or a menu item, or inputs a voice command, a gesture, a motion, or a touch pattern through the touch sensor 250, the input/output module 210 or the camera 260, and the controller 290 executes a camera application corresponding to the user input. The controller 290 configures a camera application window 1610 by using data stored in the memory 220, and displays the configured camera application window 1610 to the user through the first projector 270 and the first window 280.

The camera application displays a photographing button 1620 for photographing, a photographing position or focus position indicator 1630, and menu items 1640 such as environment setting and a flash, on the camera application window 1610.

Figure 17:
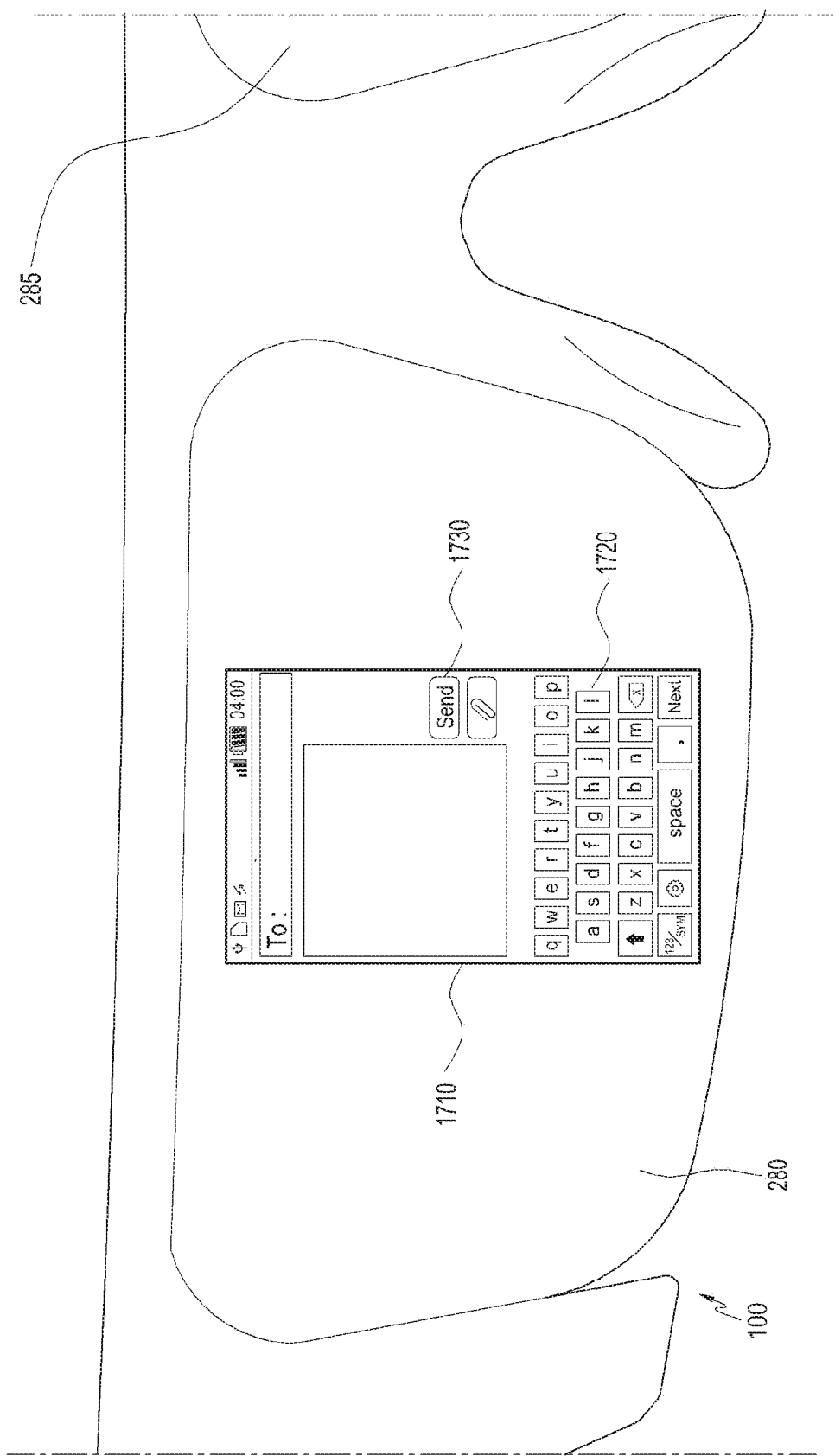
FIG. 17 illustrates a fifth example of a method for providing a virtual image according to an embodiment of the present invention.

FIG. 17 illustrates a fifth example of the method for providing a virtual image according to an embodiment of the present invention.

Referring to FIG. 17, the user selects the button 213, an icon or a menu item, or inputs a voice command, a gesture, a motion, or a touch pattern through the touch sensor 250, the input/output module 210 or the camera 260, and the controller 290 executes a message application corresponding to the user input. The controller 290 configures a message application window 1710 by using data stored in the memory 220, and displays the configured message application window 1710 to the user through the first projector 270 and the first window 280.

The message application displays a keypad 1720 for text input and menu items 1730 such as message transmission and file attachment, on the message application window 1710.

According to an embodiment of the present invention, a virtual image and a real image are concurrently provided by using an HOE-based coupler, window, and reduces weight and size of the HMD device by integrally forming glass and a HOE. In addition, a window adjusts a transmissivity of light with an electric signal, thus improving outdoor visibility of the virtual image, The window is driven with low power, thus reducing heat emission and lengthening the battery lifespan. Moreover, the window has a large Field of View (FoV) and good display quality.

The above-described embodiments of the present invention may be implemented with hardware, software, or a combination of hardware and software. The software may be stored in a volatile or non-volatile storage such as a Read-Only Memory (ROM), a memory such as a Random Access Memory (RAM), a memory chip, a device, or an integrated circuit, and an optically or magnetically recordable and machine (e.g., computer)-readable storage medium such as a Compact Disc (CD), a Digital Versatile Disk (DVD), a magnetic disk, or a magnetic tape. A memory which can be included in the HMD device includes, e.g., a machine-readable storage medium which is suitable for storing a program or programs including instructions for implementing the audio content playback method according to the embodiment of the present invention. Therefore, the present invention includes a program including codes for implementing the audio content playback apparatus or method according to the embodiments of the present invention and a machine-readable storage medium for storing such a program. The program may be electronically transferred through a medium such as a communication signal delivered through wired or wireless connection, and the present invention properly includes equivalents thereof.

The HMD device receives and stores the program from a program providing device connected in a wired or wireless manner. The program providing device includes a memory for storing a program including instructions for instructing the HMD device to execute a preset operating mode, information necessary for the operating mode, a communication unit for performing wired or wireless communication with the electronic paper, and a controller for transmitting a corresponding program to the HMD device at the request of the HMD device or automatically.

While the present invention has been particularly illustrated and described with reference to certain embodiments thereof, various modifications or changes can be made without departing from the scope of the present invention. Therefore, the scope of the present invention is not limited to the described embodiments, should be defined by the scope of the following claims and any equivalents thereof.

What is claimed is:

1. A method for providing an image to a user in a head-mounted display (HMD) device, the method comprising:
   detecting an ambient illumination;
   calculating a target transmissivity of a window provided in the HMD device, based on the ambient illumination;
   adjusting a transmissivity of the window based on the calculated target transmissivity; and
   providing the image to the user by projecting light from outside of the window onto a surface of the window using a projector provided in the HMD device, an intensity of the light corresponding to the adjusted transmissivity of the window,
   wherein a holographic optical element (HOE) comprised in the window is configured to reflect the projected light, and wherein the window is configured to converge the reflected light on a pupil of an eye of the user or on a crystalline lens of the eye based on the HOE comprising a focal length corresponding to a distance between the HOE and the pupil or the crystalline lens such that the image is provided regardless of focus adjustment of the eye of the user.

2. The method of claim 1, wherein the target transmissivity of the window corresponding to the detected ambient illumination is calculated by using a data table that indicates ambient illumination values and target transmissivities of the window corresponding to the ambient illumination values.

3. The method of claim 1, wherein the transmissivity of the window is reduced when the detected ambient illumination is higher than a currently set ambient illumination, and the transmissivity of the window is increased when the detected ambient illumination is lower than the currently set ambient illumination.

4. The method of claim 1, further comprising:
receiving an input of the user; and
updating and displaying the image according to the input of the user.

5. The method of claim 1, wherein the image is a graphic user interface (GUI) corresponding to a user input or event occurrence.

6. The method of claim 1, wherein an output of the projector is reduced based on the adjusting of the transmissivity of the window.

7. A non-transitory computer-readable storage medium having recorded thereon a program for executing a method for providing an image to a user in a head-mounted display (HMD) device, the method comprising:
detecting an ambient illumination;
calculating a target transmissivity of a window provided in the HMD device, based on the ambient illumination;
adjusting a transmissivity of the window based on the calculated target transmissivity; and
providing the image to the user by projecting light from outside of the window onto a surface of the window using a projector provided in the HMD device, an intensity of the light corresponding to the adjusted transmissivity of the window,
wherein a holographic optical element (HOE) comprised in the window is configured to reflect the projected light, and
wherein the window is configured to converge the reflected light on a pupil of an eye of the user or on a crystalline lens of the eye based on the HOE comprising a focal length corresponding to a distance between the HOE and the pupil or the crystalline lens such that the image is provided regardless of focus adjustment of the eye of the user.

8. The non-transitory computer-readable storage medium of claim 7, wherein an output of the projector is reduced based on the adjusting of the transmissivity of the window.

9. The non-transitory computer-readable storage medium of claim 7, wherein the target transmissivity of the window corresponding to the detected ambient illumination is calculated by using a data table that indicates ambient illumination values and corresponding target transmissivities of the window.

10. The non-transitory computer-readable storage medium of claim 7, wherein the transmissivity of the window is reduced when the detected ambient illumination is higher than a currently set ambient illumination, and the transmissivity of the window is increased when the detected ambient illumination is lower than the currently set ambient illumination.

11. The non-transitory computer-readable storage medium of claim 7, the method further comprises:
receiving an input of the user; and
updating and displaying the image according to the input of the user.

12. A head-mounted display (HMD) device for providing an image to a user, the HMD device comprising:
a sensor;
a projector;
a window; and
a controller configured to:
detect an ambient illumination,
calculate a target transmissivity of the window corresponding to the detected ambient illumination,
adjust a transmissivity of the window according to the calculated target transmissivity, and
provide the image to the user by projecting light from outside of the window onto a surface of the window using a projector provided in the HMD device, an intensity of the light corresponding to the adjusted transmissivity of the window,
wherein a holographic optical element (HOE) comprised in the window is configured to reflect the projected light, and
wherein the window is configured to converge the reflected light on a pupil of an eye of the user or on a crystalline lens of the eye based on the HOE comprising a focal length corresponding to a distance between the HOE and the pupil or the crystalline lens such that the image is provided regardless of focus adjustment of the eye of the user.

13. The HMD device of claim 12, wherein the window passes ambient light therethrough.

14. The HMD device of claim 12, wherein the window comprises:
a glass having a transmissivity that changes with a signal applied from the controller; and
the HOE having a holographic pattern for reflecting and condensing the light input from the projector.

15. The HMD device of claim 12, further comprising:
a memory for storing a data table that indicates ambient illumination values and target transmissivities of the window corresponding to the ambient illumination values,
wherein the controller is further configured to calculate the target transmissivity of the window corresponding to the detected ambient illumination by using the data table.

16. The HMD device of claim 12, wherein the controller is further configured to apply a voltage corresponding to the target transmissivity to the window to adjust the transmissivity of the window.

17. The HMD device of claim 12, wherein the controller is further configured to reduce the transmissivity of the window when the detected ambient illumination is higher than a currently set ambient illumination, and increase the transmissivity of the window when the detected ambient illumination is lower than the currently set ambient illumination.

18. The HMD device of claim 12, wherein an output of the projector is reduced based on the adjusting of the transmissivity of the window.

* * * * *